United States Patent
Smartt et al.

(10) Patent No.: US 7,813,873 B2
(45) Date of Patent: Oct. 12, 2010

(54) GEOCODING LOCATIONS NEAR A SPECIFIED CITY

(75) Inventors: Brian E. Smartt, Sunnyvale, CA (US); Richard F. Poppen, San Jose, CA (US); Linnea A. Dunn, Bonny Doon, CA (US)

(73) Assignee: deCarta Inc., San Jose, CA (US)

(*) Notice: Subject to any disclaimer, the term of this patent is extended or adjusted under 35 U.S.C. 154(b) by 549 days.

(21) Appl. No.: 11/018,566

(22) Filed: Dec. 20, 2004

(65) Prior Publication Data

US 2005/0171691 A1    Aug. 4, 2005

Related U.S. Application Data

(60) Provisional application No. 60/530,935, filed on Dec. 19, 2003.

(51) Int. Cl.
*G01C 21/30* (2006.01)
*G01C 21/32* (2006.01)

(52) U.S. Cl. ............. 701/208; 701/200; 701/201; 701/202; 701/209; 701/211; 701/214; 340/990; 340/995.1

(58) Field of Classification Search ......... 701/200, 701/201, 202, 208, 209, 211, 214; 340/990, 340/995.1
See application file for complete search history.

(56) References Cited

U.S. PATENT DOCUMENTS

| | | | | |
|---|---|---|---|---|
| 5,963,956 A * | 10/1999 | Smartt | | 1/1 |
| 6,009,403 A * | 12/1999 | Sato | | 705/6 |
| 6,202,065 B1 * | 3/2001 | Wills | | 1/1 |
| 6,473,692 B2 * | 10/2002 | Hancock et al. | | 701/208 |
| 6,487,495 B1 * | 11/2002 | Gale et al. | | 701/209 |
| 6,597,983 B2 * | 7/2003 | Hancock | | 701/200 |
| 6,609,062 B2 * | 8/2003 | Hancock | | 701/200 |
| 7,007,010 B2 * | 2/2006 | Cooper | | 707/3 |
| 7,007,228 B1 * | 2/2006 | Carro | | 715/210 |
| 7,272,489 B2 * | 9/2007 | Tu | | 701/200 |
| 7,383,275 B2 * | 6/2008 | Chen et al. | | 707/743 |
| 7,421,275 B1 * | 9/2008 | Hancock et al. | | 455/456.1 |
| 7,580,927 B1 * | 8/2009 | Abugov et al. | | 1/1 |
| 2001/0029426 A1 * | 10/2001 | Hancock et al. | | 701/200 |
| 2002/0059226 A1 * | 5/2002 | Cooper | | 707/6 |
| 2002/0087260 A1 * | 7/2002 | Hancock et al. | | 701/200 |
| 2003/0018428 A1 * | 1/2003 | Knockeart et al. | | 701/210 |
| 2003/0023586 A1 * | 1/2003 | Knorr | | 707/3 |

(Continued)

OTHER PUBLICATIONS

Examiner's First Report on Australian Patent Application No. 2004308385, Nov. 13, 2008, 2 Pages.

(Continued)

*Primary Examiner*—Khoi Tran
*Assistant Examiner*—Jorge O Peche
(74) *Attorney, Agent, or Firm*—Fenwick & West LLP

(57) ABSTRACT

Specified streets or intersections that are within a specified distance of a specified city can be found by a search, even when they are not actually in that city. For computational efficiency, some addresses are included in search results even when they exceed the specified distance from the specified city by a small amount ("false positives"). The search method guarantees that no instance of the street name within the specified distance of the specified city is erroneously missed ("false negatives").

14 Claims, 3 Drawing Sheets

U.S. PATENT DOCUMENTS

2003/0033176 A1* 2/2003 Hancock .................... 705/6
2003/0036842 A1* 2/2003 Hancock .................. 701/200
2003/0056149 A1* 3/2003 Hue ......................... 714/38
2003/0065805 A1* 4/2003 Barnes, Jr. ............... 709/231
2003/0074136 A1* 4/2003 Hancock et al. ........... 701/213
2004/0036622 A1* 2/2004 Dukach et al. ........ 340/691.6
2004/0117358 A1* 6/2004 von Kaenel et al. .......... 707/3
2008/0301042 A1* 12/2008 Patzer ...................... 705/39

OTHER PUBLICATIONS

Supplemental European Search Report for European Patent Application No. EP 04815136, Dec. 11, 2008, 3 Pages.

* cited by examiner

GEOCODING LOCATIONS NEAR A SPECIFIED CITY

CROSS-REFERENCE TO RELATED APPLICATIONS

This application claims the benefit of U.S. Provisional Application No. 60/530,935, filed on Dec. 19, 2003, which is incorporated by reference herein in its entirety.

BACKGROUND OF THE INVENTION

1. Field of the Invention

The present invention relates generally to digital mapping. More specifically, the present invention is related to geocoding operations designed to locate geographic objects where there is uncertainty about a portion of an object identifier such as a city in which the object is located.

2. Description of the Related Art

Many modern computing systems use digital maps to allow users to orient themselves, to find the locations of desired addresses, intersections, or businesses, to be directed to those locations, and for many other purposes. For example, maps and driving directions are available from many sites on the World Wide Web; many companies make maps of, and directions to, their office locations available to customers on the Web; many vehicles, hand-held computers, and even mobile phones contain navigation systems designed to assist drivers in locating specified destinations.

One process that is integral to the use of such systems is called "geocoding". Geocoding is the process of converting a description of a location from a form meaningful to humans (for example, a street address, a street intersection, a highway exit number, or the name of a point of interest) to a form usable by computers (typically a numerical longitude and latitude). For example, in human-readable format, an address might appear in a form such as "Palo Alto Airport of Santa Clara County, 1925 Embarcadero Road, Palo Alto, Calif.". The same address after geocoding could be "longitude −122.113085 degrees, latitude +37.453938 degrees".

To request a map on the World Wide Web, a consumer describes the location at which the map should be centered; to request directions, the consumer describes the origin and destination. To make its list of locations available, a company converts the locations' street addresses to coordinates; then to find a location, the customer describes the starting point of the search. To obtain guidance from a mobile navigation system, the user describes the destination. There are of course many applications of geocoding in addition to those described here.

While the general definition of geocoding is broader, in practice most uses of geocoding take as input either street addresses (for example, street name, city, state or province, and optionally house number) or intersections (for example, two street names, city, and state or province). Although for simplicity we describe the present invention using these two applications of geocoding, this is purely for readability and is not intended to limit the application of the invention described below.

A major inconvenience in geocoding is that often end users are not sure what city an address or intersection is in. When many cities are in close proximity, a user may think an address or intersection is in one city when in fact it is in another nearby city. In such cases conventional geocoding software can fail: If the intersection of Grant and Pine is in Mayfield, then geocoding "Grant & Pine, Bellport" will fail, even if the intersection is just one block from Bellport.

Some conventional systems that geocode are forgiving of slight errors in specifying an address to be mapped. Typically, they work by knowing, for each city, all the adjoining cities, or all the cities that come within a specified distance of the specified city. The same may be true for postal code, county, or other geographic subdivision being specified. However, because these subdivisions are often irregular, and can be quite large, there is no upper bound on how far away a result can be from the original target city. For example, a user might be looking for an address in West Hollywood. Los Angeles is adjacent to West Hollywood, and is very large. Using a conventional system, a user-who specifies a-West Hollywood address might be presented with a result in Los Angeles that is actually very far away from West Hollywood and not relevant to the user's search.

In view of the foregoing, a need therefore exists for a way to locate a geographic object when a portion of the address has been specified incorrectly.

SUMMARY OF THE INVENTION

The present invention enables specified streets or intersections that are within a specified buffer distance of a specified city to be found by a search, even when they are not actually in that city. For computational efficiency, some addresses are included in search results even when they exceed the specified distance from the specified city by a small amount ("false positives"). Use of the present invention guarantees that no instance of the street name within the specified distance of the specified city is erroneously missed ("false negatives").

In one embodiment, a geographic object to be located is identified by, for example, a street name, street number and city. A user (or automated process) additionally specifies a buffer distance relative to an uncertain portion of the geographic object identification-for example, if the user is uncertain of the city in which the geographic object is actually located, the user may specify a buffer distance from the city, e.g., 5 miles, which should also be searched to locate the object. In this embodiment, the present invention then finds a set of keys associated with map data records, the keys having a footprint including the specified city and any point within the buffer distance of the specified city, and then intersects that set of keys with a set of keys associated with data records for all instances of the specified street. The geographic object being located will then be in one of the data records identified by the intersection of the keys. As described below, false positives—instances of the geographic object located more than a threshold distance from the buffer distance of the city—can be reduced or eliminated.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

System Architecture

Figure 1:
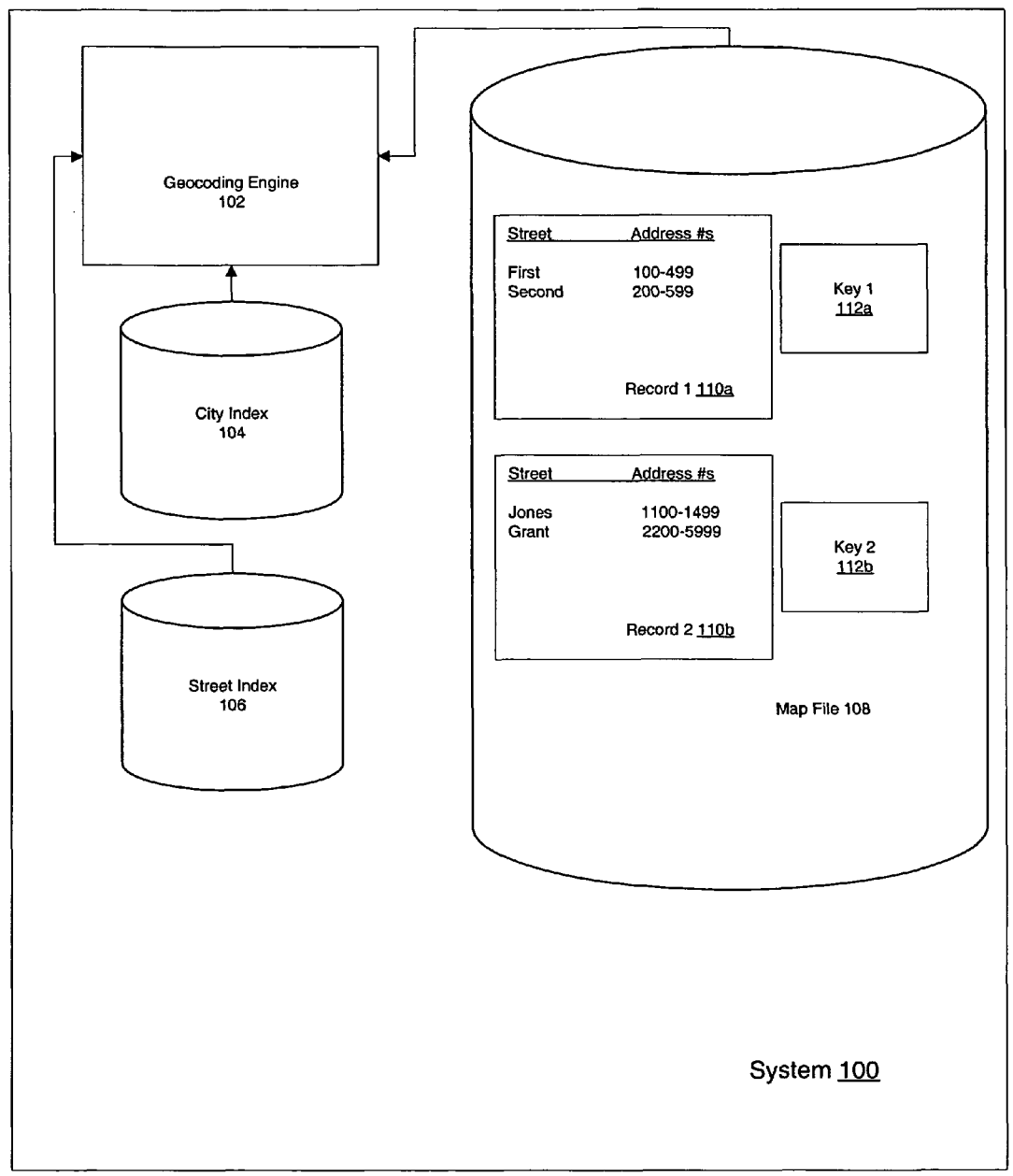
FIG. 1 is a block diagram of a system for locating geographic objects in accordance with an embodiment of the present invention.

FIG. 1 illustrates a system 100 for performing nearby geocoding in accordance with an embodiment of the present invention. System 100 includes a geocoding engine 102, a city index 104, a street index 106, and a map file 108. Each of these components of system 100 is described further below.

In a preferred embodiment, map data is constructed prior to use of system 100 for providing nearby geocoding. Constructing map data preferably includes building three files: the map file 108 and two index files, the city index file 104 and the street index file 106.

Data in the map file 108—in particular, data regarding the locations and address numbers of streets—is preferably divided into records 110a, 110b, etc. of geographically contiguous data. Lookup keys 112a, 112b, etc. are assigned to these records 110a, 110b, etc., as a function of their geographical location, one key per record. Keys preferably correspond to geographic regions, map data for which is included in the record to which they are assigned. Preferably, the keys contain no actual map data about the geographic region. The geographic regions corresponding to distinct keys may or may not overlap. In a preferred embodiment, the following three operations are computationally efficient: first, given a key 112, the coordinates of the geographical region corresponding to the key (the key's "footprint") can be determined without making reference to the map data file; second, given one or more keys 112, the data from the records 110 with those keys can be retrieved from the data file 108; and third, given a geographically defined region, a list of keys 112 can be generated such that any data record 110 contained in or overlapping the region has a key which is in the list (a list of all keys whose footprints are contained in or overlap the region), without reference to the data file. One such method of dividing, indexing, and storing data is taught in U.S. Pat. No. 5,963,956, "System and method of optimizing database queries in two or more dimensions", incorporated herein by reference in its entirety.

A city index 104 associates a city name with a list of the keys of all data records 110 that contain data for streets in that city. This index can be constructed, for example, by first scanning through the map data contained in the data records 110 and, for every street, noting its city and the key 112 for its data, and then indexing that data by city name.

A street index 106 associates a street name with a list of all data records 110 that contain data for streets with that name. This index can be constructed, for example, by first scanning through the map data and, for every street, noting its name and the key 112 for its data, and then indexing those keys by street name.

System Operation

System 100 has application in a variety of contexts in which a location identified by an address is to be displayed on a map. For example, system 100 may be used in connection with a web-based mapping service as described above, in which a web user enters an address to be mapped. Alternatively, perhaps a retailer is interested in creating a map that shows the location of her business on a map, generated according to the address she enters. Also, lookups might be prompted by a program rather than by a human requestor, for example, when many addresses are being geocoded to make a list of a company's locations—and for this purpose, the term "user" includes such automated requesters. Those of skill in the art will recognize that many situations exist in which a location specified by an address is sought to be found on a map, and will understand that system 100 can be employed in each of those contexts.

Figure 2A:
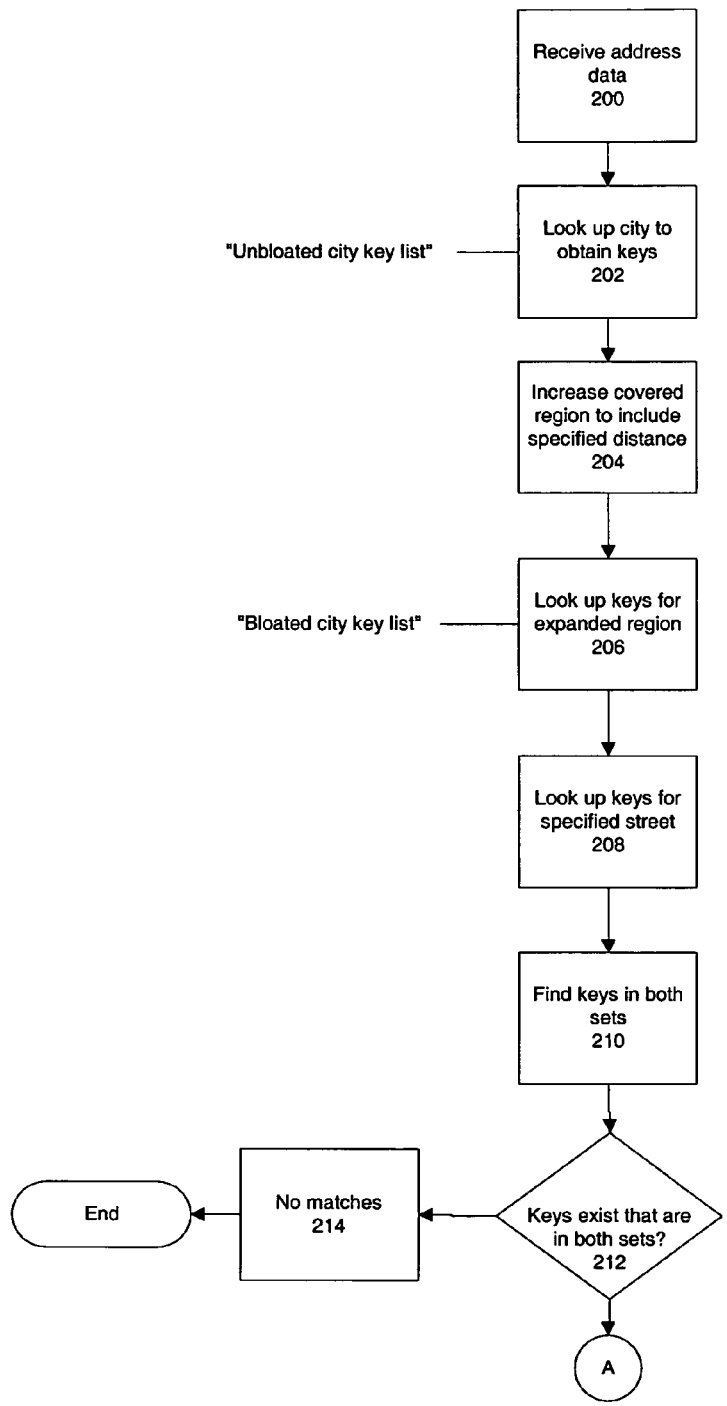
FIGS. 2A and 2B are a flowchart illustrating a method for locating geographic objects in accordance with an embodiment of the present invention.

In a preferred embodiment, and referring now to FIG. 2A, system 100 takes 200 as input a street address or intersection, a city, and a distance from that city. For example, a user may be aware of an address, but be unsure whether it is actually in Bellport, or just outside of Bellport in Mayfield. The user may ask to look up "485 Grant Avenue, Bellport" (even though 485 Grant Avenue is really in Mayfield), with a buffer distance of 1 mile.

Geocoding engine 102 looks up 202 the specified city in the city index 104 to obtain a list of keys 112 containing data for that city. This list is referred to as an "unbloated city key list". Geocoding engine 102 then "bloats" the list of keys by taking the list of keys, determining a geographical region represented by the union of the keys' footprints, expanding 204 the region to include all points within the specified buffer distance of the union of the key's footprints, and finally determining 206 a list of all keys whose footprints are contained in or overlap the expanded region. Any data within the specified buffer distance of the specified city will be contained in a record whose key is in the newly-determined set. This list of keys is referred to as a "bloated city key list". Continuing the example above, system 100 uses the city index 104 to look up all the keys for data in Bellport, determines the footprints of those keys, considers the region within 1 mile of the union of those footprints, and obtains a list of all keys whose footprints are contained in or overlap the latter region.

Geocoding engine 102 then looks up 208 the specified street name in the street index 106, and obtains a list of keys for data records including that street, referred to as the "street key list". In the example above, the system looks up "Grant Avenue" in the street list and obtains the list of all the keys for records containing streets called "Grant Avenue".

Figure 2B:
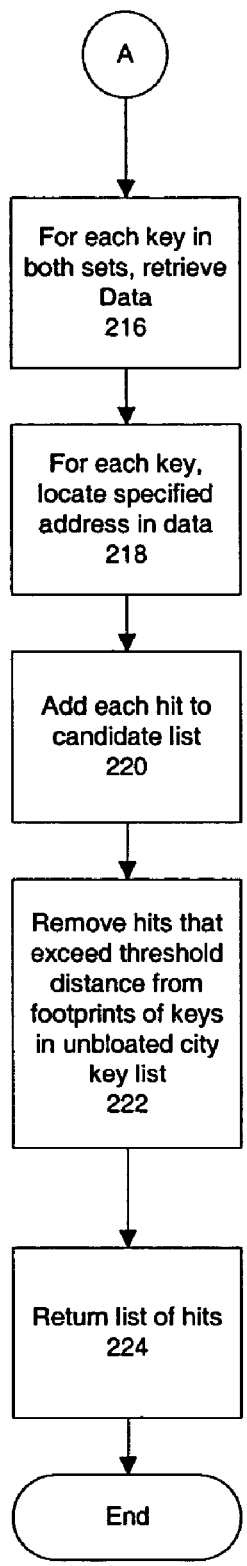

Geocoding engine 102 then finds 210 the intersection of the bloated city key list and the street key list. If this intersection is empty 212—i.e., if no key is in both lists—then 214 there is no instance of the address within the specified distance of the specified city. Referring now to FIG. 2B, if there are keys in both lists, geocoding engine 102 retrieves 216 the map data records for each such key in turn and scans through it, locating 218 the specified address. Each instance of the specified address is added 220 to a list of candidates. In the continuing example, system 100 finds the intersection of the key lists. For each key, it retrieves the data, and searches through it looking for 485 Grant Avenue. Each time it finds an instance of 485 Grant Avenue, it adds that to the list of candidates. Note that while the example described uses a street key list to reduce the number of records to be examined in the bloated city list, in an alternative embodiment, each key in the bloated city list can be examined to see if it contains an instance of the specified address, and if so added to the list of candidates. Using a street key list intersected with the bloated city key list, as described above, reduces the amount of data to be parsed, but is not required in every embodiment.

Note that at this point, every instance of the specified address within the specified buffer distance of the specified city is guaranteed—assuming accurate map data—to be in the list of candidates. Some candidates may, however, be more than the specified buffer distance from the specified city; however, the extra distance will be no greater than twice the greatest possible distance across a key's footprint (for example, the diagonal of a key's footprint, if the footprint is rectangular). This extra distance, i.e. the distance between the specified buffer and the distance across a key's footprint, can be termed a threshold distance. False positives that occur within the threshold distance region can be located and removed as described further below. In one embodiment, the threshold distance is specified at design time, and may be a consequence of the way in which key footprints are selected. In alternative embodiments, threshold distances can be supplied at run time, e.g., by the searcher.

In one embodiment, such as when computational speed is more important than minimizing the number of false positives, geocoding engine 102 can simply return the list of candidates 224. If reducing the number of false positives is important, a further step can be added in an alternative embodiment. In this alternative embodiment, for each candidate in the candidate list, geocoding engine 102 determines the distance from the candidate to the previously computed region determined by the union of the footprints of the keys in the unbloated city key list. If this distance is more than the specified distance, the candidate is dropped 222 from the candidate list. Once this is done, there may still be false positives in the candidate list, but now the extra distance will be no more than the greatest possible distance across a key's footprint (no longer twice that distance). In the continuing example, perhaps the candidate list contains 485 Grant Avenue, Mayfield and 485 Grant Avenue, Shaker Heights. We compute the distance from each of these to the union of the footprints of the keys in the unbloated city key list for Bellport. We find that 485 Grant Avenue, Mayfield is 0.5 mile from that union, less than the 1 mile specified, so it stays in the list of candidates. We find that 485 Grant Avenue, Shaker Heights is 1.5 miles from that union, more than the 1 mile specified, so it gets dropped from the list.

In an alternative embodiment, it is possible to add yet a further refinement to eliminate false positives altogether, though at the cost of still greater computation time. In that embodiment, geocoding engine 102 copies the list of candidates into a new list, the list of "unverified candidates". For each candidate in the list of unverified candidates, geocoding engine 102 determines a set of keys whose footprints come within the buffer distance of that candidate (the candidate's "nearby key list"). Geocoding engine 102 then considers each key in the unbloated city key list. If the key is in both the unbloated city key list and the nearby key list of any unverified candidate, geocoding engine 102 retrieves the record having map data associated with that key. Geocoding engine 102 then steps through the data in that record, examining each entry to see whether it is in the specified city. If it is, geocoding engine 102 determines the distance from that entry to each unverified candidate. If an unverified candidate is within the specified distance of that entry, it is not a false positive, because it is located within the buffer distance of a point in the city, and it is therefore removed from the list of unverified candidates. Geocoding engine 102 continues, examining each key's associated data record in turn, until either all keys in the unbloated city key list have been considered or the list of unverified candidates has become empty (because unverified candidates that were false positives may have been removed already). Then all remaining unverified candidates are removed from the candidate list created in step 220, and the search is complete. At this point there are no false positives in the candidate list.

Note that in an alternative embodiment, the candidates in the candidate list could be marked as verified or unverified without creating a separate unverified candidate list. Those of skill in the art will appreciate that a number of variations exist for marking each candidate as having been verified or not, and the particular implementation chosen is not significant for purposes of the invention.

What has just been described is a process for looking up street addresses. A similar process can be employed if, for example, the street name, but not the house number, is known. The process is also similar when intersections, not street addresses, are searched for. In that case, a street key list is generated for both streets, not just one; then the bloated city key list is intersected with both street key lists, not just one; then the data searched for, in each case, is the intersection, not the single street.

Note that while the present invention has been described in terms of finding an address or intersection in which a city has been specified incorrectly, the present invention can also be implemented to handle a situation where another parameter of the address has been incorrectly specified, for example, a district, county, province, prefecture, etc., according to the principles described above. In each case, the address or intersection to be found is near a specified area with a geographic extent, such that the requestor might not be certain what is inside the area and what is outside.

In an additional embodiment, a requestor can specify two (or more) regions about which there is uncertainty—for example, the requestor might ask for 100 Main Street within 1 mile of a city named Springfield, and within 5 miles of the state of Illinois. Geocoding engine 102 can be configured to create a bloated key list of all cities called Springfield, and a bloated key list of Illinois. Next, an intersection of the key lists is found, thus yielding all keys that are associated with locations both within one mile of a Springfield and five miles of Illinois. Geocoding engine 102 then determines a list of keys corresponding to data records including a Main Street, and finds which of those keys are in the intersection of the bloated key lists. The candidate list can then be pared down as described above, but even if it is not pared down, the correct address is guaranteed to be in the candidate list already. Those of skill in the art will readily recognize that the number of unknown regions can extend beyond two, by creating additional intersections of additional bloated key lists.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of geocoding engine $102_{13}$ and so forth may be provided in many or one module.

Some portions of the above description present the feature of the present invention in terms of algorithms and symbolic representations of operations on information. These algorithmic descriptions and representations are the means used by those skilled in the navigational systems arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A method for identifying a location of a point of interest, the point of interest having an address, the address including at least a street component and a city component, the method comprising:

receiving, by a computer, an input address, the input address including an input street component and an input city component;

identifying an unbloated city key list, the unbloated city key list including a first set of geospatial keys, each key having a footprint, and each key including data associated with the input city;

determining a buffer distance;

determining a first geographic region defined by a union of the footprints of the keys in the unbloated city key list;

determining a second geographic region, the second geographic region defined by expanding the first geographic region to include all points within the determined buffer distance of the first geographic region;

identifying a bloated city key list, the bloated city key list including a second set of geospatial keys, each key having a footprint contained in or overlapping the second geographic region;

determining a street key list, the street key list including a set of geospatial keys including data associated with the input street;

determining an intersecting set of keys, each key in the intersecting set being a member of the bloated city key list and the street key list;

retrieving map data for each key in the intersecting set of keys;

determining a candidate set of points of interest, each point of interest in the candidate set having an address included in the footprint of at least one key in the intersecting set of keys; and displaying indicia of at least one of the points of interest of the candidate set of points of interest.

2. The method of claim 1 wherein displaying the indicia of at least one of the points of interest includes displaying a location of the point of interest on a digital map.

3. The method of claim 1 wherein the input street component is an intersection of two streets.

4. The method of claim 1 wherein determining the candidate set of points of interest further comprises:

determining a distance to the input city from each point of interest in the candidate set; and removing from the candidate set of points of interest each point of interest having a distance to the input city greater than the buffer distance.

5. The method of claim 1 wherein the buffer distance is received in conjunction with the address of the geographic object to be located.

6. The method of claim 1 wherein the buffer distance is determined according to a stored value.

7. The method of claim 1 wherein displaying indicia of at least one of the points of interest comprises displaying the indicia on a web page via a network.

8. A computer program product having a non-transitory computer-readable storage medium having computer executable code for locating a geographic object, the code adapted to cause a processor to execute the steps of:

receiving an input address, the input address including an input street component and an input city component;

identifying an unbloated city key list, the unbloated city key list including a first set of geospatial keys, each key having a footprint, and each key including data associated with the input city;

determining a buffer distance;

determining a first geographic region defined by a union of the footprints of the keys in the unbloated city key list;

determining a second geographic region, the second geographic region defined by expanding the first geographic region to include all points within the determined buffer distance of the first geographic region;

identifying a bloated city key list, the bloated city key list including a second set of geospatial keys, each key having a footprint contained in or overlapping the second geographic region;

determining a street key list, the street key list including a set of geospatial keys including data associated with the input street;

determining an intersecting set of keys, each key in the intersecting set being a member of the bloated city key list and the street key list;

retrieving map data for each key in the intersecting set of keys;

determining a candidate set of points of interest, each point of interest in the candidate set having an address included in the footprint of at least one key in the intersecting set of keys; and displaying indicia of at least one of the points of interest of the candidate set of points of interest.

9. The computer program product of claim 8 wherein displaying the indicia of at least one of the points of interest includes displaying a location of the point of interest on a digital map.

10. The computer program product of claim 8 wherein the input street component is an intersection of two streets.

11. The method of claim 8 wherein determining the candidate set of points of interest further comprises:

determining a distance to the input city from each point of interest in the candidate set; and removing from the candidate set of points of interest each point of interest having a distance to the input city greater than the buffer distance.

12. The computer program product of claim 8 wherein the buffer distance is received in conjunction with the address of the geographic object to be located.

13. The computer program product of claim 8 wherein the buffer distance is determined according to a stored value.

14. The computer program product of claim 8 wherein displaying indicia of at least one of the points of interest comprises displaying the indicia on a web page via a network.

* * * * *